Figure 1:
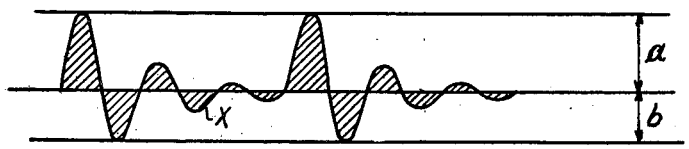

March 30, 1943. K. H. F. SCHLEGEL 2,315,097
METHOD AND APPARATUS FOR PRODUCING PHOTOGRAPHIC SOUND RECORDS
Filed July 19, 1938 2 Sheets-Sheet 1

INVENTOR
K.H.F. SCHLEGEL
BY Young, Emery & Thompson
ATTYS.

March 30, 1943.  K. H. F. SCHLEGEL  2,315,097

METHOD AND APPARATUS FOR PRODUCING PHOTOGRAPHIC SOUND RECORDS

Filed July 19, 1938  2 Sheets-Sheet 2

K. H. F. SCHLEGEL INVENTOR

BY Young, Emery & Thompson ATTYS.

Patented Mar. 30, 1943

2,315,097

UNITED STATES PATENT OFFICE 2,315,097

METHOD AND APPARATUS FOR PRODUCING PHOTOGRAPHIC SOUND RECORDS

Karl Hermann Franz Schlegel, Lyngby, Denmark; vested in the Alien Property Custodian Application July 19, 1938, Serial No. 220,101
In Denmark July 22, 1937

10 Claims. (Cl. 179—100.3)

The present invention relates to improvements in methods of producing photographic sound records of the noiseless type and further to improvements in apparatus for the said purpose.

In producing sound records of the kind referred to, the sounds are converted into electrical pulses, and a sensitive film is exposed to a beam of light, which is varied by way of the said pulses not only in accordance with the wave-form of the said pulses, but additionally in accordance with the volume of the said waves, so that the average amount of light impinging the said film is varied in accordance with the intensity of the said pulses.

It is well known in the art to control the variations of the average amount of light impinging the film by way of a variable potential, to which a condenser arranged in a circuit, controlling the said light beam, is charged by a rectified portion of the said pulses, and further it is well known to use means causing the said condenser to be discharged at a relatively slow rate only, when the intensity of the pulses to be recorded decreases in order that a decrease of the said average amount of light should not cause a distortion of the recorded variations by cutting off the peaks of the amplitudes of same.

Now, when the average amount of light impinging the film has assumed an arbitary maximum value corresponding to an instantaneous maximum value of the intensity of the pulses to be recorded, the said value of the average amount would, in the hitherto known methods of the kind referred to, commence to decrease immediately when the intensity of the pulses commences to decrease, and this is a drawback, because it often occurs that the intensity of the sound—and consequently the intensity of the pulses to be recorded—is suddenly increased again after having commenced to decrease, and if so, the average amount of light having commenced to decrease would, due to the fact that the time constant of the circuit of the rectified current causes a delay of the charge of the condenser, not be re-increased sufficiently rapidly to prevent the peaks of the first amplitudes of the re-increasing pulses from being cut off in the record, thus causing distortion of the sound when reproduced.

In order to remedy this drawback, the said arbitrary maximum value of the average amount of light impinging the film should according to the present invention be maintained at a substantially constant level, during a predetermined short time after the corresponding arbitrary arbitrary maximum intensity of the pulses has ceased to exist.

In a preferred apparatus for carrying out the method according to the present invention, a half-wave rectifier is used for rectifying the portion of the sound responsive pulses, which should charge the above-mentioned condenser arranged in a control circuit, which includes the said condenser and the said rectifier and means for causing the potential of the condenser to actuate the beam of light. According to the present invention, the purpose aimed at is secured by way of a second control circuit, which includes a separate condenser and a second half-wave rectifier arranged to allow the same half-waves of the rectified portion of the pulses as the first-named rectifier to pass so as to charge the said separate condenser to a potential, which is slightly higher than the potential to which the condenser in the first-named control circuit is simultaneously charged. These two control circuits are mutually connected up in such a manner that the discharge of the first-mentioned condenser, when the intensity of the pulses has passed an arbitary maximum value, cannot commence before the potential of the said separate condenser, due to the discharge of same, has decreased to the value of the potential to which the first-mentioned condenser was charged. Thereby the discharge of the condenser controlling the average amount of light is delayed so as to secure the effect aimed at according to the invention.

In order to limit the maximum value, which the average amount of light impinging the film may assume by the influence of increasing pulses, a third control circuit may be provided, which circuit includes a rectifier allowing the uni-directed half-wave of the above-mentioned portion of the pulses, which would not be passed through the two other half-wave rectifiers mentioned above, to pass on to a condenser arranged in the said third control circuit so as to be charged by the half-waves passing same.

In the said third control circuit including a condenser and a half-wave rectifier, there is further included a source of constant potential and means to supply this potential in series with the potential, to which the last-mentioned condenser is charged, to the discharged circuit of the condenser controlling the average amount of light in such a manner that the potential of this latter condenser cannot cause the average amount of light to increase above a certain value controlled by the potential of the condenser in the said third control circuit.

In order that the average amount of light impinging the film should always be adjusted to one and the same value when a sound of certain intensity appears, irrespectively of whether the sound oscillation is continuous or discontinuous, the average amount of light should according to the present invention preferably be determined by the maximum intensity of the pulses to be recorded and not by the volume of the said pulses as in the hitherto known methods.

Further, it should be remarked that the period of time, within which the average amount of light impinging the film should be maintained at a constant level after the intensity of the pulses has passed an arbitary maximum, may be, for instance, 1/30 of a second.

Figure 2:
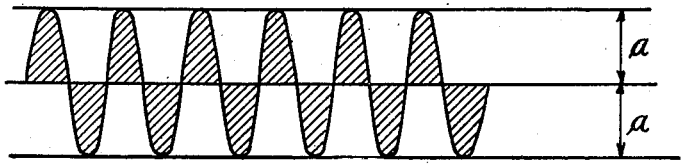
Figure 4:
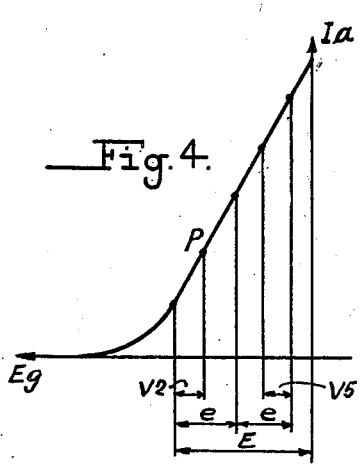
Figure 3:
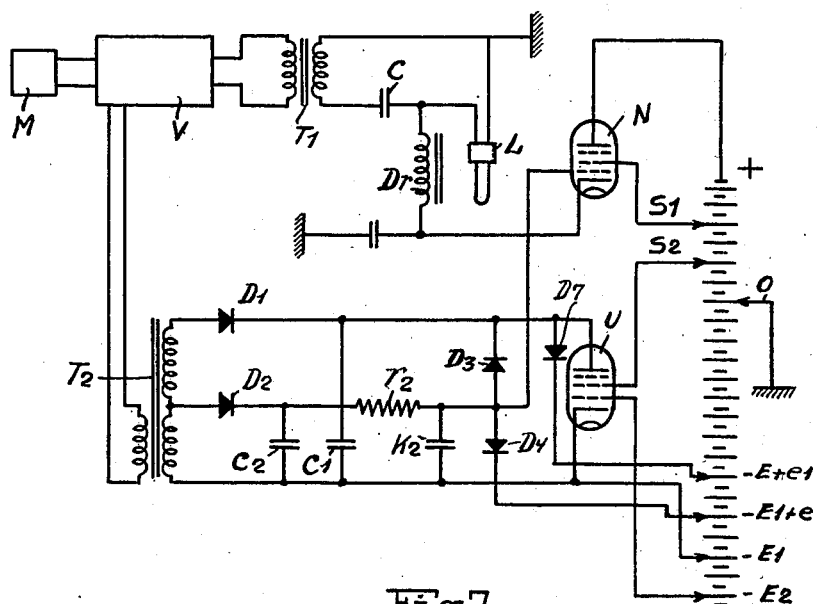

The invention will now be more fully described with reference to the annexed drawings, in which:

Fig. 1 shows, graphically, a discontinuous trace of speech oscillations,

Fig. 2 graphically, a continuous trace of musical oscillations,

Fig. 3 the electric circuit diagram for an apparatus for recording of sound with a control of the mean lighting, as above set forth, Fig. 4 the anode-current grid-voltage characteristic of an amplifier valve used for controlling the mean lighting.

Figure 5:
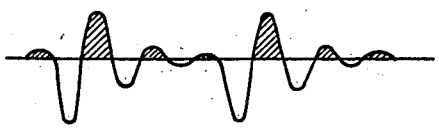
Figure 6:
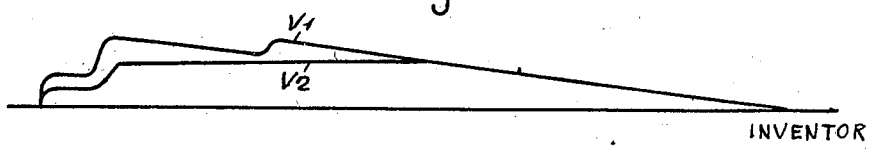
Figure 7:
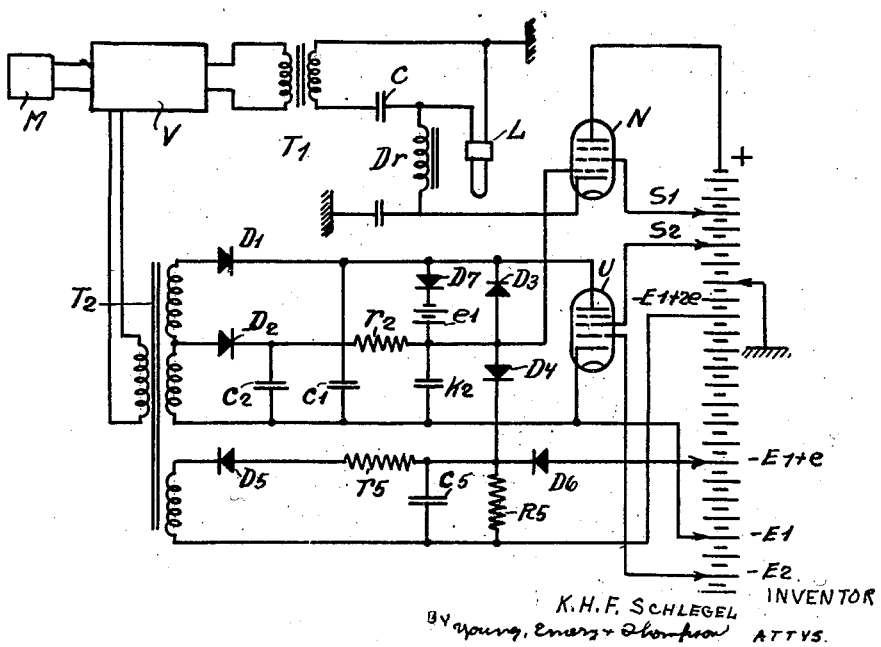

Fig. 5 graphically, the unilateral rectification of a discontinuous alternating current to be recorded, Fig. 6 the condenser voltages produced by the same and Fig. 7 the circuit diagram for a modified construction of an apparatus for the recording of sound.

The alternating currents into which the speech is converted in order to be recorded, for instance on a film, are generally of the discontinuous form shown in Fig. 1, each sound being composed of several consecutive discontinuous sets of vibrations. The alternating currents, into which music is converted in order to be recorded, have generally a continuous or approximately continuous form, corresponding for a pure organ tone roughly to the sinusoid shown in Fig. 2.

As the mean lighting of a film, according to the methods known heretofore for the production of so-called noiseless sound records, is controlled by means of a condenser charged by voltage impulses produced by the alternating currents shown in Figures 1 and 2, after the same, or rather a part of the same have been rectified, it is seen immediately that if the charging of the condenser is effected successively by several consecutive half-waves, the value of the mean lighting will be dependent on the cross-hatched areas of the current curves concerned shown in Figures 1 and 2. These cross-hatched areas are smaller in Figure 1 than in Figure 2, the consequence being that if the recording apparatus is adjusted in such a manner that the mean lighting is adjusted according to the maximum amplitude $a$ in the sound record according to Figure 1, then the mean lighting will be too great in the case of a continuous oscillation as illustrated in Figure 2, with the same maximum amplitude $a$. This feature is unsuitable, and is remedied, at least partly, according to the present invention in that the recording member is connected in such a manner that the amplitude $a$ in Figure 1 by the recording gives an increase in the lighting on the film.

This amplitude may consequently be recorded without any modification of the mean lighting. The other half-wave, with amplitude $b$, will consequently by the recording reduce the lighting on the film, and requires, therefore, the mean lighting to be increased. This half-wave is, therefore, utilized for displacing the zero line, and thereby the smallest possible displacement and consequently the maximum noiselessness will be attained.

According to the invention, the displacement of the zero line is thus determined by the amplitude of one single half-wave in the sound, independently of the other half-waves in the periodically repeated discontinuous oscillations characterising the sound.

The recognition of the fact that it is possible to control the mean lighting in this manner is based upon the observation that in the voltage diagram for a given circuit system for apparatus for recording of sound, the half-waves in the discontinuous oscillations that have the amplitude $a$, Figure 1. Consequently, also the half-waves having the amplitude $b$ will practically always be situated to one of the same side relatively to the zero line of the diagram. Whether these half-waves cause a momentary decrease or a momentary increase in the lighting of the film will depend solely on the sense in which the polarities of undulations proceeding from the circuit system are applied to the recording member. According to the invention the connections are arranged in such a manner that a half-wave with the amplitude $a$ which for the sake of simplicity is assumed to be the first occurring half-wave in a speech oscillation, will be actuating the recording member, when the latter occupies a position, in which the lighting on the film is very slight or is equal to zero, will be recorded by a momentary increase in the lighting of the film. The recording of this half-wave requires, therefore, as mentioned, no special displacement of the zero line. The subsequent oscillation with the amplitude $b$ is utilized for charging the above mentioned condenser across a rectifier cutting off all the half-waves that are directed in the same sense or have the same sign as the half-wave amplitude $a$.

The half-wave undulation with the amplitude $b$ will consequently partly alter the mean lighting, and partly cause a momentary decrease in the latter. This decrease will generally occur before the mean lighting has undergone a sufficient increase by the action of the first occurring half-wave with the amplitude $b$, for which reason the peak of the latter will as a rule be cut off on the graph trace, but already before the next discontinuous oscillation in the same sound occurs, the increase in the mean lighting will be completed, and the next half-wave $x$, Figure 1, with this amplitude and, consequently, all subsequent oscillations in the same sound will be recorded completely.

The constants for the above mentioned charging circuit are adjusted in such a manner that the charging of the condenser will be finished within the course of a discontinuous oscillation in a sound, for instance during the course of a 250th part of a second. The constants of the discharging circuit are adjusted in such a manner that the condenser will not discharge itself appreciably during the maximum duration of a discontinuous speech oscillation, for instance 1/30 of a second.

In Fig. 3 M is a microphone for converting sound oscillations into a sound responsive current, and V is a device for amplifying this current. T is a transformer, by way of which the amplified current is transferred to the operating circuit of a light valve L adapted to oscillate a light beam, by means of which the sound oscillations are recorded on a film in a well-known manner.

A portion of the sound responsive current is fed to the primary winding of a transformer $T_2$, the secondary winding of which is connected up in two different circuits, one of which includes a rectifier $D_1$ and a condenser $C_1$ in series, whilst the other circuit includes a rectifier $D_2$ and a condenser $C_2$ in series.

The rectifiers $D_1$ and $D_2$ are so arranged that the half-waves of the portion of the sound responsive current, which is fed to the said rectifiers by way of the transformer $T_2$, correspond to the half waves $b$, Fig. 1, and the time constants of the said two circuits including the rectifiers $D_1$ and $D_2$ and the condensers $C_1$ and $C_2$ are so chosen that the said half-wave, when appearing, charges both of said condensers instantaneously so that the condenser $C_1$ is charged to a voltage being somewhat higher than the voltage, to which the condenser $C_2$ is charged, and so that both of said voltages are sufficiently high to prevent that the consecutive half-waves having a smaller amplitude than the half-wave $b$ are allowed to pass the rectifiers $D_1$ and $D_2$. Consequently the charges of the two condensers $C_1$ and $C_2$ would be determined by the volume of the half-wave $b$.

In order to indicate that the condenser $C_1$ is charged to a higher voltage than the condenser $C_2$ the secondary winding of the transformer $T_2$ is shown as comprising two parts, one of which is connected up in the circuit of the condenser $C_2$, whilst both of said parts are connected up in series in the circuit of the condenser $C_1$.

The mean position occupied by the oscillograph L is determined by the anode current in a valve N. In the case of preparing sound records of the variable width constant density type, which is assumed in the following for the sake of simplicity, the said position is adjusted in such a manner that the zero line of the sound trace is situated at the edge of the region of the film reserved for the sound record, when the grid bias of the valve N has the value $E_1$. When the grid bias increases to $-E_1 \times e$, the zero line is supposed to be displaced to the central line of the sound track concerned. Thus a control voltage causing a maximum displacement of the zero line and, consequently, the maximum variation of the average amount of light used for the recording purpose would have the value $e$.

The voltage $E_1$ is selected in such a manner that the rectilinear portion of the anode-current grid voltage characteristic P of the valve N, cf. Figure 4, is used.

The mean position of the light valve and, consequently, the average value of the amount of light used for the recording purpose is controlled by the charge of a condenser $K_2$, which in series with a resistor $r_2$ is connected across the condenser $C_2$, Fig. 3, in that the condenser $K_2$, the capacity of which is small relatively to the capacity of the condenser $C_2$, is charged from the latter through the resistor $r_2$ to a voltage $v_2$ being substantially the same as the voltage $v_2$ of the condenser $C_2$. The voltage of the condenser $C_1$ is designated by $v_1$ and, consequently, $v_1 > v_2$.

The time constant of the circuit including the condenser $K_2$ and the resistor $r_2$ and the condenser $C_2$ is so chosen that the charging of the condenser $K_2$ is effected at the rate of velocity at which it is desired to vary the average amount of light impinging the film, when a sound oscillation having a second half-wave of the magnitude $b$ appears. The said condenser $K_2$ is namely included in the grid circuit of a value N, the anode current of which influences the light valve L so as to alter the mean position, about which the latter is oscillated by the influence of the sound responsive current, for which reason the rate of velocity of the variations of the said anode current and, consequently, of the average amount of light impinging the film depends upon the rate of velocity, at which the condenser $K_2$ is charged. It would be evident that the magnitude of the said variation, i. e. the magnitude of the displacement of the zero line of the recorded oscillations, responsive to the volume of same, is depending upon the magnitude of the voltage $v_2$ across the condenser $K_2$.

$D_4$ is a rectifier connected across the condenser $K_2$ in series with a portion—having the voltage $e$—of a high voltage source. The rectifier $D_4$ will prevent the voltage across the condenser $K_2$ to exceed the value $e$ and, consequently, prevent a displacement of the zero line beyond the centre line of the sound track.

The return motion of the zero line of the recorded variations to a position near one edge of the sound track, which means the decrease of the average amount of light impinging the film after a previous increase of the said amount depends upon the discharge of the condenser $K_2$. The said condenser is discharged through a rectifier $D_3$ and a pentode valve U in series, whilst the condenser $C_1$ is discharged directly through the valve U. The rectifier $D_3$ connected up between the two condensers $C_1$ and $C_2$ would prevent the latter from being discharged, until the voltage across the condenser $C_1$ has decreased to the same value as the voltage $v_2$. Thus the condenser $C_1$ delays the discharge of the condenser $C_2$ so that the average amount of light impinging the film after having been increased to a certain value by voltage $v_2$ is maintained at that value through a period of time depending upon the rate of velocity of the discharge of the condenser $C_1$, i. e. depending upon the difference of voltage $v_1 - v_2$.

While the voltage $v_2$ can never exceed $e$, the voltage $v_1$ may increase to any arbitrary value depending upon the intensity of the half-wave $b$. This may cause an undesired delay of the return motion of the zero line, which drawback is avoided by the use of a detector $D_7$ inserted between the anode of the valve U and a point of the high voltage source having the potential $-E+e_1$, so that the voltage $v_1$ cannot increase to a value higher than $e_1.e_1$, for instance, is so adjusted that $$\frac{e_1}{e_2} = \frac{v_1}{v_2}$$

When a number of consecutive discontinuous oscillations appears, the voltage $v_1$ will vary as indicated by the characteristic $v_1$ in Fig. 6. In order that the variations of the voltage $v_1$ appearing from this figure should not cause that the said voltage is momentarily reduced to a value less than the desired value of the voltage $v_2$ within the period of time, in which the said oscillations appear, the electric constants of the discharge circuit of the condenser $C_1$, i. e. the electric constants of the valve U and, besides, the difference between the voltage $v_1$ and $v_2$ should be chosen with due regard hereto, so that the return motion of the zero line should not commence before the lapse of a certain period of time, assumed for instance to be $1/30$ second, after the appearance of a half-wave of the volume $b$.

It would be evident that the voltage $v_2$ after having caused an increase of the average amount of light impinging the film to a value depending upon the intensity of the first half-wave having the amplitude $b$, Fig. 1, will remain at a constant level, see the characteristic $v_2$ in Fig. 6, and, consequently, maintained the said increase of the amount of light until the half-wave of the intensity $b$ of a subsequent discontinuous oscillation appears, so that this oscillation would be recorded completely, provided that this subsequent oscillation appears within the above mentioned time interval, for instance 1/30 second or to any other desired magnitude, in which the voltage $v_1$ cannot decrease to the voltage $v_2$.

Experience has shown that the difference between the two voltages $v_1$ and $v_2$ should not be too great, and, therefore, the discharge of the condenser $C_1$ should preferably be effected with constant current, for which reason the discharge is effected by way of the pentode U. The voltage $v_1$ will then, for the same duration of the discharge, sink more slowly at the beginning of the period of discharge than it would, if the discharge had been effected across an ohmic resistance.

As appears from Figure 5, it is assumed that the connections to the light valve L, for instance an oscillograph, in Figure 3 are selected in such a manner that the maximum amplitudes $a$ of the sound are recorded by the oscillograph by an increase in the lighting of the film, the assumption being that the sound film to be recorded is a negative one. These amplitudes require no zero line displacement in order to be recorded completely. In Figure 5, the half-waves to be recorded by a decrease in the lighting of the film are cross-hatched, while the other half-waves are not cross-hatched.

In speech oscillations, as mentioned above, the lack of symmetry in the wave graph lies nearly always to the same side, but in the case of musical oscillations being symmetrical, the said conditions in the wave graph do not always exist, and in that case it will be desirable to allow a displacement of the zero line beyond the centre of the sound track, but only so far, however, that the maximum amplitude, because they have such a direction that they are not recorded by a decrease, but by an increase in the light intensity, can just be recorded without the peaks being cut off. This possible arrangement of the zero line control is at hand in the apparatus according to Figure 7. In this construction the voltage $v_2$, Figure 6, can increase to the value $2e$, i. e. that the zero line can be displaced across the sound track from one boundary of same to the opposite boundary. In order to secure the possibility of completely recording the half-waves having their peaks directed towards that boundary of the track, which is opposite to the edge, at which the zero line is situated, when no sounds appear, the half-waves represented by the amplitudes $a$ in Figs. 1 and 2 may be caused to charge a condenser $C_5$, Fig. 7, to a voltage $V_5$ by way of a rectifier $D_5$ and a resistor $r_5$. The said condenser is discharged through a resistance $R_5$, to which one end of the rectifier $D_4$ is connected, so that the voltage $v_5$ limits the displacement of the zero line beyond the central line of the sound track, so that this displacement will not be greater than required for recording the maximum amplitudes $a$, Figs. 1 and 2.

In order to prevent the voltage $v_5$ from causing the zero line to be moved beyond the central line of the sound track there is inserted, between the condenser $C_5$ and the high voltage source K, a rectifier $D_6$, which is connected to such a point of the source K that the voltage applied to the rectifier $D_6$ will be $-E_1 + e$. Then the voltage $v_5$ cannot exceed $e$.

Having now particularly described and ascertained the nature of my invention and in what manner the same is to be performed I declare that what I claim is:

1. A method of producing a photographic sound record of the noiseless type, which comprises converting the sounds to be recorded into electrical pulses, exposing a sensitive film to a beam of light, varying the amount of light impinging the film in accordance with the wave form of the said pulses, additionally varying the average value of the amount of light impinging on the film in accordance with the maximum amplitudes of the said pulses, and maintaining the average value of the amount of light determined by the largest of the said maximum amplitudes within any part of the sound record during a pre-determined short time after the said largest amplitude has occurred.

2. A method of producing a photographic sound record of the noiseless type, which comprises converting the sounds to be recorded into electrical pulses, exposing a sensitive film to a beam of light, varying the amount of light impinging the film in accordance with the wave form of the said pulses, additionally varying the average value of the amount of light impinging on the film in accordance with the maximum amplitudes of the said pulses in the half-wave region of same which is opposite to the direction in which the said average value is changed and maintaining the average value of the amount of light determined by the largest of said maximum amplitudes at a constant level during a pre-determined short time after the said largest amplitude has occurred.

3. A method of producing a photographic sound record of the noiseless type, which comprises converting the sounds to be recorded into electrical pulses, exposing a sensitive film to a beam of light, varying the amount of light impinging the film in accordance with the wave form of the said pulses, additionally varying the average value of the amount of light impinging on the film in accordance with the maximum amplitudes of the said pulses in the half-wave region of same which is opposite to the direction in which the said average value is changed and limiting the change of the average amount of light caused by the said maximum amplitudes by way of the maximum amplitudes of the said pulses in the opposite half-wave region of same.

4. A method of producing a photographic sound record of the noiseless type, which comprises converting the sounds to be recorded into electrical pulses, exposing a sensitive film to a beam of light, varying the amount of light impinging the film in accordance with the wave form of the said pulses, additionally varying the average value of the amount of light impinging on the film in accordance with the maximum amplitudes of the said pulses in the half-wave region of same which is opposite to the direction in which the said average value is changed and limiting the change of the average amount of light caused by the said maximum amplitudes by way of the maximum amplitudes of the said pulses in the opposite half-wave region of same, and maintaining the average value of the amount of light determined by the largest of the said maximum amplitudes of the said pulses at a constant level during a pre-determined short time after the said largest amplitude has occurred.

5. An apparatus for producing photographic sound records of the noiseless type by exposing a sensitive film to a beam of light, comprising means for directing the said beam of light onto the film, means for converting the sounds into a sound responsive electric current, means to cause the said beam of light to vary in accordance with the wave form of the said current, a semi-wave rectifier arranged to allow uni-directed half-waves of a portion of the sound responsive current to pass, a condenser arranged to be charged by these half-waves, a control circuit including the said rectifier and the said condenser, means for causing the potential of the said condenser to vary the average value of the amount of light impinging the said film, and means to maintain the said potential at a constant level until a predetermined period of time has expired since the rectified current has ceased to charge the said condenser.

6. An apparatus according to claim 5, comprising a second condenser and a resistance connected up in series across the condenser charged by the rectified current, the said second condenser having a capacity of a considerably smaller value than that of the other of said condensers so as to be charged from the latter through the said resistance to substantially the same potential as this latter condenser, and being connected up in the grid circuit of a thermionic valve, the anode current of which controls the exposure of the film.

7. An apparatus for producing photographic sound records of the noiseless type by exposing a sensitive film to a beam of light, comprising means for directing the said beam of light onto the film, means for converting the sounds into a sound responsive electric current, means to cause the said beam of light to vary in accordance with the wave form of the said current, a condenser, a semi-wave rectifier arranged to allow uni-directed half-waves of a portion of the sound responsive current to pass on to the said condenser to charge the latter, a control circuit including the said rectifier and the said condenser, and means for causing the potential of the said condenser to vary the average value of the amount of light impinging the said film, a second control circuit including a separate condenser and a separate half-wave rectifier arranged to allow the same half-waves of a portion of the sound responsive current as the first-mentioned half-wave rectifier to pass on to the said separate condenser to charge the latter to a potential higher than the potential of the first-mentioned condenser, and means to cause the potential on the said separate condenser to delay the commencement of the discharge of the first-mentioned condenser, when the rectified current momentarily ceases to charge the said two condensers.

8. An apparatus for producing photographic sound records of the noiseless type by exposing a sensitive film to a beam of light, comprising means for directing the said beam of light onto the film, means for converting the sounds into a sound responsive electric current, means to cause the said beam of light to vary in accordance with the wave form of the said current, a semi-wave rectifier arranged to allow uni-directed half-waves of a portion of the sound responsive current to pass, a condenser arranged to be charged by the said half-waves, a control circuit including the said rectifier and the said condenser, and means for causing the potential of the said condenser to vary the average value of the amount of light impinging the said film, a second control circuit including a separate half-wave rectifier arranged to allow the same uni-directed half-waves of a portion of the sound responsive current as the first-mentioned rectifier to pass a separate condenser connected up in the said second control circuit so as to be charged by the half-waves passing same to a potential higher than the potential to which the first-mentioned condenser is simultaneously charged, and means to cause the potential on the said separate condenser to delay the commencement of the discharge of the first-mentioned condenser, when the rectified current momentarily ceases to charge the said two condensers, a third control circuit including condenser and a half-wave rectifier arranged to allow the half-waves of the said portion not passing the first-mentioned rectifier to pass on to the last-mentioned condenser to charge the same, and means causing the potential of this latter condenser to limit the maximum value of the potential, to which the first-mentioned condenser is simultaneously charged.

9. An apparatus according to claim 8, in which the means for limiting the maximum value of the potential varying the average amount of light impinging the film comprises a resister, which is connected across the condenser in the third control circuit, a rectifier having one terminal connected to one end of the said resister and the other terminal connected up in the circuit of the condenser causing the variations of the average amount of light impinging the film, and a source of constant potential inserted between the other end of said resister and the other terminal of the last-mentioned condenser.

10. An apparatus for producing photographic sound records of the noiseless type by exposing a sensitive film to a beam of light, comprising means for directing the said beam of light onto the film, means for converting the sounds into a sound responsive electric current, means to cause the said beam of light to vary in accordance with the wave form of the said current, a semi-wave rectifier arranged to allow uni-directed half-waves of a portion of the sound responsive current to pass, a condenser arranged to be charged by these half-waves, a control circuit including the said rectifier and the said condenser and having a time constant allowing the said condenser to be charged to a potential varying in accordance with the maximum amplitude of the said half-waves, means for causing the potential of the said condenser to vary the average value of the amount of light impinging the said film, a second condenser arranged to be charged by the same half-waves of the said portion of the sound responsive current as the first-mentioned condenser but to a higher potential than the latter, a second control circuit including the said second condenser, means for rectifying a portion of the sound responsive current, and means to cause the potential on the said second condenser to delay the commencement of the discharge of the first-mentioned condenser, when the amplitude of said half-wave of the sound responsive current has passed its maximum value, and a third control circuit, including a rectifier for the passage of the half-waves of the rectified portion of the sound responsive current not passing the two other control circuits and a condenser arranged to be charged by the last-mentioned rectifier, and means causing the potential of this latter condenser to limit the maximum value of the potential, to which the first-mentioned condenser is simultaneously charged.

KARL HERMANN FRANZ SCHLEGEL.